United States Patent
Eusterwiemann

(10) Patent No.: US 11,033,951 B2
(45) Date of Patent: Jun. 15, 2021

(54) METHOD FOR FILLING A RIVET CARTRIDGE WITH RIVET ELEMENTS

(71) Applicant: Broetje-Automation GmbH, Rastede (DE)

(72) Inventor: Christoph Eusterwiemann, Oldenburg (DE)

(73) Assignee: Broetje-Automation GmbH, Rastede (DE)

( * ) Notice: Subject to any disclaimer, the term of this patent is extended or adjusted under 35 U.S.C. 154(b) by 0 days.

(21) Appl. No.: 16/099,018

(22) PCT Filed: May 12, 2017

(86) PCT No.: PCT/EP2017/061513
§ 371 (c)(1),
(2) Date: Nov. 5, 2018

(87) PCT Pub. No.: WO2017/194760
PCT Pub. Date: Nov. 16, 2017

(65) Prior Publication Data
US 2019/0134701 A1   May 9, 2019

(30) Foreign Application Priority Data
May 13, 2016   (DE) .......................... 10 2016 108 874

(51) Int. Cl.
*B21J 15/32* (2006.01)
*B21J 15/28* (2006.01)
(Continued)

(52) U.S. Cl.
CPC .............. *B21J 15/32* (2013.01); *B21J 15/28* (2013.01); *B25J 9/1697* (2013.01); *B65G 47/14* (2013.01); *G05B 2219/39161* (2013.01)

(58) Field of Classification Search
CPC .......... B21J 15/32; B21J 15/28; B25J 9/1697; B65G 47/14; G05B 2219/39161
See application file for complete search history.

(56) References Cited

U.S. PATENT DOCUMENTS 4,828,159 A * 5/1989 Woods ..................... B21J 15/28
227/112
5,011,339 A * 4/1991 Aurtoi ..................... B21J 15/32
406/191
(Continued)

FOREIGN PATENT DOCUMENTS

CN   101402088   4/2009
CN   102266902   12/2011
(Continued)

OTHER PUBLICATIONS

WO20100052602, EPO English Translation; Mueller et al.; Method for Separating Small Items; pp. 1-4; Mar. 9, 2020.*
(Continued)

*Primary Examiner* — Bayan Salone
(74) *Attorney, Agent, or Firm* — Pauly, DeVries Smith & Deffner LLC

(57) ABSTRACT

The disclosure relates to a method for filling a rivet cartridge with rivet elements by means of a rivet loading station having a rivet delivery unit for delivering the rivet elements and having a rivet cartridge receiving means for receiving a rivet cartridge, wherein the rivet elements are supplied from the rivet delivery unit to a rivet cartridge which is received in the rivet cartridge receiving means and are received therein in an aligned manner. It is proposed that at least part of the transport from the rivet delivery unit to the rivet cartridge is effected in a robot-based manner.

17 Claims, 3 Drawing Sheets

(51) Int. Cl.
*B25J 9/16* (2006.01)
*B65G 47/14* (2006.01)

(56) References Cited

U.S. PATENT DOCUMENTS

| | | | |
|---|---|---|---|
| 5,014,894 A | 5/1991 | Smart | |
| 5,150,623 A * | 9/1992 | Woods | B21J 15/28 73/865.8 |
| 5,727,300 A * | 3/1998 | Ekdahl | B21J 15/10 29/407.04 |
| 7,882,981 B2 | 2/2011 | Auriol et al. | |
| 8,006,362 B2 * | 8/2011 | Sarh | B23P 19/007 29/402.01 |
| 8,721,252 B2 * | 5/2014 | Osada | B65G 47/24 414/331.01 |
| 2008/0244888 A1 * | 10/2008 | Sarh | B21J 15/142 29/402.01 |
| 2011/0018291 A1 * | 1/2011 | Osada | B65G 47/22 294/65.5 |
| 2017/0056960 A1 * | 3/2017 | Ficken | G01B 11/02 |
| 2017/0151643 A1 * | 6/2017 | Ficken | B23B 49/00 |
| 2017/0348857 A1 | 12/2017 | Vasquez et al. | |
| 2018/0345354 A1 | 12/2018 | Eusterwiemann | |
| 2019/0009304 A1 | 1/2019 | Voisin et al. | |
| 2019/0143399 A1 | 5/2019 | Kasahara et al. | |
| 2019/0291171 A1 | 9/2019 | Eusterwiemann | |

FOREIGN PATENT DOCUMENTS

| | | | |
|---|---|---|---|
| CN | 102829726 | | 12/2012 |
| CN | 104668427 | | 6/2015 |
| DE | 102008056246 | | 5/2010 |
| DE | 202008014886 | | 5/2010 |
| DE | 102009040764 | | 3/2011 |
| DE | 102011113832 | | 3/2013 |
| DE | 102012020981 | | 5/2013 |
| DE | 102014106312 | | 11/2015 |
| EP | 2253415 | | 11/2010 |
| GB | 2147841 A * | 5/1985 | ............ B21J 15/32 |
| JP | S60123231 | | 8/1985 |
| SU | 347096 | | 9/1972 |
| SU | 1660828 | | 7/1991 |
| SU | 1660828 A1 * | 7/1991 | |
| WO | WO-2010052602 A2 * | 5/2010 | ............ B21J 15/323 |
| WO | 2015169727 | | 11/2015 |
| WO | 2017103391 | | 6/2017 |
| WO | 2017194749 | | 11/2017 |
| WO | 2017194760 | | 11/2017 |

OTHER PUBLICATIONS

"German Search Report," for Priority Application No. DE102016108875.7 dated Jan. 26, 2017 (7 pages).
"German Search Report," for Priority Application No. DE102016108874.9 dated Jan. 26, 2017 (9 pages).
"International Search Report and Written Opinion," for PCT Application No. PCT/EP2017/061482 dated Aug. 22, 2017 (12 pages).
"International Search Report and Written Opinion," for PCT Application No. PCT/EP2017061513 dated Jul. 17, 2017 (15 pages).
Chinese Search Report for Chinese Patent Application No. 201780029668.0 dated Aug. 23, 2019 (3 pages).
Chinese Search Report for Chinese Patent Application No. 201780029716.6 dated Sep. 9, 2019 (3 pages).
Chinese Search Report for Chinese Patent Application No. 201780029668.0 dated Jun. 4, 2020 (2 pages) English Translation Only.
Non-Final Office Action for U.S. Appl. No. 16/301,155 dated Aug. 11, 2020 (25 pages).
Response to Non-Final Rejection dated Aug. 11, 2020 for U.S. Appl. No. 16/301,155, submitted via EFS-Web on Jan. 11, 2021, 9 pages.
"Final Office Action," for U.S. Appl. No. 16/301,155 dated Apr. 15, 2021 (9 pages).

* cited by examiner

METHOD FOR FILLING A RIVET CARTRIDGE WITH RIVET ELEMENTS

CROSS-REFERENCE TO RELATED APPLICATIONS

This application is a national stage application under 35 U.S.C. 371 of International Patent Application Serial No. PCT/EP2017/061513, entitled "Method for Filling a Rivet Cartridge with Rivet Elements," filed May 12, 2017, which claims priority from German Patent Application No. DE 10 2016 108 874.9, filed May 13, 2016, the disclosure of which is incorporated herein by reference.

FIELD OF TECHNOLOGY

The disclosure relates to a method for filling a rivet cartridge with rivet elements, to a method for producing a structural component and to a rivet loading station.

BACKGROUND

It is known from the prior art that for filling a rivet cartridge rivet elements are separated into singles by a rivet delivery unit configured as a vibrating spiral conveyor, their alignment is tested and the rivet elements are then supplied to a rivet cartridge. These rivet loading stations must, when different types of riveting elements are to be supplied to a rivet cartridge, be manually adjusted to the respective rivet elements to be handled and their geometry. These manual adjustments require a considerable amount of effort to set up.

SUMMARY

An object of the present disclosure is to enable simple and flexible filling of rivet cartridges with rivet elements.

The object is achieved with a method as described herein.

Since the rivet elements are supplied from the rivet delivery unit to a rivet cartridge which is received in the rivet cartridge receiving means and are received therein in an aligned manner, and in the process at least part of the transport from the rivet delivery unit to the rivet cartridge is effected in a robot-based manner, extremely flexible handling of very different rivet elements is possible. In some embodiments, no mechanical adjustments have to be made to the rivet delivery unit in order to adjust them to a particular rivet element genus and/or particular geometries of the rivet elements. The rivet elements can be removed easily from the rivet delivery unit and supplied to the rivet cartridge by one or, where applicable, several robots. Rivet elements of very different diameters or very different lengths can also be grasped easily by a gripper and supplied to the rivet cartridge.

Various developments of the method, which show the flexibility of the method for filling rivet cartridges with very different rivet elements, are described herein.

According to some embodiments, the rivet elements are separated into singles in the rivet delivery unit and, in some embodiments, supplied to a gripping region. This allows the rivet elements to be picked up particularly easily by the robot.

Method steps relating to the control unit and the testing of the rivet elements are described herein.

Some embodiments describe a design of the transfer of the rivet element from the robot to the rivet cartridge.

The object described in the introduction above can be achieved with a method for producing a structural component as described herein. The same advantages are obtained as described beforehand in conjunction with the method for filling a rivet cartridge.

Finally, the object described in the introduction is also solved by a rivet loading station as described herein. The same advantages are produced as described above in connection with the method. The features described in connection with the method apply correspondingly to the rivet loading station.

Various embodiments provide a method for filling a rivet cartridge with rivet elements by means of a rivet loading station having a rivet delivery unit for delivering the rivet elements and having a rivet cartridge receiving means for receiving a rivet cartridge, wherein the rivet elements are supplied from the rivet delivery unit to a rivet cartridge which is received in the rivet cartridge receiving means and are received therein in an aligned manner, wherein at least part of the transport from the rivet delivery unit to the rivet cartridge is effected in a robot-based manner.

In various embodiments, rivets of a different genus, in particular of a different type, and/or a different nominal length and/or a different nominal diameter, can be supplied to a rivet cartridge or to different rivet cartridges by the rivet loading station without modifying the mechanical configuration of the rivet loading station.

In various embodiments, rivet collars of a different genus, in particular of a different type, and/or a different nominal length and/or a different nominal diameter, can be supplied to a rivet cartridge or to different rivet cartridges by the rivet loading station without modifying the mechanical configuration of the rivet loading station.

In various embodiments, rivets and rivet collars can be supplied to a rivet cartridge or to different rivet cartridges by the rivet loading station without modifying the mechanical configuration of the rivet loading station.

In various embodiments, the rivet elements are separated into singles in the rivet delivery unit and can be supplied to a gripping region, such as wherein the rivet elements are gripped in the gripping region in a robot-based manner.

In various embodiments, the rivet loading station comprises a control unit for controlling the rivet loading station, such as wherein the control unit, by means of a sensor arrangement, in particular an optical sensor, detects the rivet elements, such as wherein the control unit, by means of the optical sensor, detects the position and/or alignment of the rivet elements in the rivet delivery unit, in particular in the gripping region, further wherein the control unit actuates the robot to pick up a rivet element on the basis of the position and/or alignment of the rivet elements.

In various embodiments, the control unit, by means of the sensor arrangement, in particular by means of the optical sensor, detects the type of a rivet element which is delivered by the rivet delivery unit and lies in particular in the gripping region, such as wherein the control unit controls whether the detected type is a required type to be filled into a rivet cartridge.

In various embodiments, predetermined characteristics of the rivet elements that are relevant to the drilling process and/or the riveting process are detected prior to supplying them to the rivet cartridge.

In various embodiments, the control unit tests the rivet elements for damage by means of the sensor arrangement, in particular by means of the optical sensor.

In various embodiments, a characteristic that is relevant to the drilling process and/or the riveting process is the rivet length and/or shank diameter and/or the shank length.

In various embodiments, the visual axis A of the optical sensor directed to the rivet delivery unit and the visual axis B of the optical sensor of the testing unit do not extend parallel to one another, such as wherein the visual axis A of the optical sensor directed to the rivet delivery unit and the visual axis B of the optical sensor of the testing unit extend substantially perpendicularly to one another.

In various embodiments, the rivet cartridge receiving means and/or rivet cartridge comprise a pocket into which the rivet elements are deposited.

In various embodiments, the rivet elements are conveyed into the rivet cartridge by means of a pressure difference, in particular by means of negative pressure or by means of compressed air.

Various embodiments provide a method to produce a structural component, in particular an aircraft structural component, wherein a rivet cartridge is filled as described herein and wherein the rivet cartridge is then inserted into a rivet storage unit of a production facility for producing a structural component and the production facility drills a hole in a structural component for generating a rivet joint and inserts a rivet element from the rivet cartridge into the hole and rivets.

Various embodiments provide a rivet loading station for carrying out a method as described herein.

BRIEF DESCRIPTION OF THE DRAWINGS

The disclosure is explained in more detail below by way of a drawing showing just one exemplary embodiment, in which.

DETAILED DESCRIPTION

Figure 1:
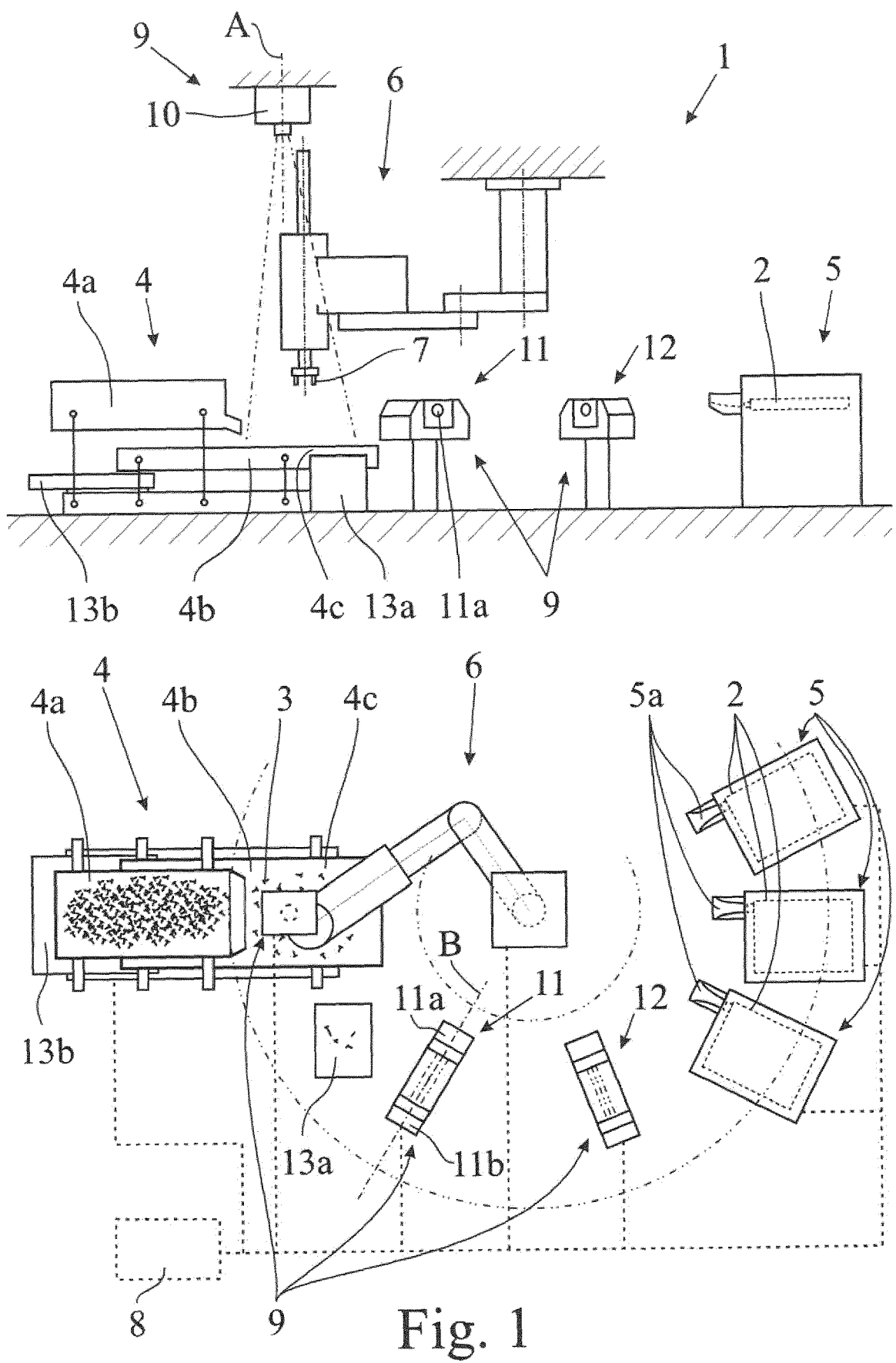
FIG. 1 shows a schematic representation of a rivet loading station as proposed for carrying out a method as proposed a) in side view, b) in top view.

FIG. 1 shows a rivet loading station 1 as proposed for filling a rivet cartridge 2 with rivet elements 3. The rivet loading station 1 comprises a rivet delivery unit 4 for delivering rivet elements 3 and a rivet cartridge receiving means 5 for receiving a rivet cartridge 2. The rivet elements 3 are supplied from the rivet delivery unit 4 to a rivet cartridge 2 received in the rivet cartridge receiving means 5 and are received therein in an aligned manner, in particular in a positionally secure manner. Here, at least part of the transport from the rivet delivery unit 4 to the rivet cartridge 2 is effected in a robot-based manner.

According to some embodiments, at least 50%, at least 80%, or at least 95% of the transports, in particular of the transport path, of the rivet elements 3 from the rivet delivery unit 4 to the rivet cartridge 2 is effected in a robot-based manner.

The robot-based transport is effected by means of a robot 6. The robot 6 here is a robot 6 with at least two rotational axes. However, the robot 6 can also comprise at least three or four or more rotational axes. In some embodiments, the robot 6 is a Skara robot or an industrial robot.

By a robot 6 removing the rivet elements 3 here from the rivet delivery unit 4 and supplying them to the rivet cartridge 2, the rivet loading station 1 is able to handle many different rivet elements 3 in a simple manner and supply them to various rivet cartridges 2.

The rivet elements 3 can be, for example, rivets 3a and/or rivet collars 3b and/or spacers. In particular, the rivet loading station 1 can comprise multiple rivet cartridge receiving means 5 for receiving rivet cartridges 2.

The rivet elements 3 are received here in various rivet cartridges 2 in dependence on a test, in particular carried out by a testing unit 11 which is to be described subsequently in more detail.

Using the rivet loading station 1, rivets of a different genus, in particular of a different type, and/or a different nominal length and/or a different nominal diameter, can be supplied to a rivet cartridge 2 or to different rivet cartridges 2 by the rivet loading station 1 without modifying the mechanical configuration of the rivet loading station 1.

In addition to this or as an alternative to it, rivet collars of a different genus, in particular of a different type, and/or a different nominal length and/or a different nominal diameter, can be supplied to a rivet cartridge 2 or to different rivet cartridges 2 by the rivet loading station 1 without modifying the mechanical configuration of the rivet loading station 1.

It is therefore also possible to supply rivets and rivet collars to a rivet cartridge 2 or to different rivet cartridges 2 by the rivet loading station 1 without modifying the mechanical configuration of the rivet loading station 1.

The same applies here and also to spacers. Spacers of a different genus, in particular of a different type, and/or a different nominal length and/or a different nominal diameter, can also be supplied to a rivet cartridge 2 or to different rivet cartridges 2 by the rivet loading station 1 without modifying the mechanical configuration of the rivet loading station 1.

This is achieved by using the robot 6. Said robot can grip the rivet elements 3 of the most varied design with its gripper 7, in particular a two-finger gripper, and supply them, in a secure and aligned manner, in particular in a positionally defined manner, to the rivet cartridges 2. In particular, all the rivet elements 3 supplied to a rivet cartridge can be received by the robot 6, aligned and supplied to the rivet cartridge 2. It is therefore also possible for all the rivet elements 3 to be aligned along the transport path from the rivet loading station 4 to the rivet cartridge. Their alignment does not have to be tested prior to their reception into the rivet cartridge 2 and in the event of a wrong alignment, they do not consequently have to be rotated or supplied once again to the rivet delivery unit 4.

In addition, a control unit 8 can be provided for controlling the rivet loading station 1. In this case, the control unit 8 can be realized centrally or decentrally, that is to say comprise either a central control unit or comprise multiple decentral control units. The control unit 8 controls the rivet delivery unit 4 and the robot 6.

For delivering the rivet elements 3, the rivet delivery unit 4 can be realized as a separating-into-singles unit. The rivet elements 3 are supplied to the rivet delivery unit 4 according to a design of the method from a secondary packaging. Data regarding the rivet elements 3, in particular data regarding the rivet elements 3 linked to the secondary packaging, can be acquired by the control unit 8. In this connection, this can be, for example, the type of the rivets 3 and/or geometric required dimensions and/or batch data. In this respect, the data regarding the rivet elements 3 can include specifications of the rivet elements 3. Acquiring can be effected, for example, by means of a barcode scanner and/or an RFID reader. Furthermore, however, manual input and/or operator selection is also possible.

Required data, in particular nominal dimensions of the rivet elements and, where applicable, batch-specific tolerance ranges, against which the rivet elements 3 can be tested, can be ascertained in this way.

The rivet delivery unit 4 comprises, here, a storage region 4a for receiving and storing rivet elements 3. The rivet delivery unit 4 then can comprise a separating-into-singles region 4b for separating the rivet 3 elements into singles and a gripping region 4c. Here, the separating-into-singles region 4b and the gripping region 4c can merge fluently into one another. The rivet elements 3 are arranged chaotically but separated-into-singles here in the gripper region 4c.

In the exemplary embodiment, for delivering the rivet elements 3 the rivet delivery unit 4 shakes, in particular as a result of wobbling movements, some rivet elements 3 out of the storage region 4a into the separating-into-singles region 4b, from where the rivet elements 3, in particular as a result of wobbling movements, are supplied, separated into singles, to the gripper region 4c. The rivet elements 3 are gripped here in the gripping region 4c in a robot-based manner, in particularly by the robot 6.

In addition, the rivet loading station 1 comprises here a sensor arrangement 9, in particular with an optical sensor 10, by means of which sensor arrangement or optical sensor the control unit 8 detects the rivet elements 3. The sensor arrangement 9 and consequently where applicable the optical sensor 10 are also possibly controlled here by the control unit 8.

The optical sensor 10 can be arranged above the rivet delivery unit 4, in particular the gripping region 4c. The coverage region of the optical sensor 9 can be directed to the gripping region 4c. In this case, the optical sensor 9 can be arranged in a stationary manner above the rivet delivery unit 4, in particular the gripping region 4c, however it can also be fastened on the robot 6.

A fastening above the rivet delivery unit 4 that is independent of robot movements is an option here. The rivet elements 3 can then be detected and their position and/or alignment determined parallel to the operating movements of the robot 6, in particular when the robot 6 is moved out of the coverage region of the optical sensor 10.

In order to improve the detecting of the rivet elements 3 in the gripping region 4c, at least the gripping region 4c is illuminated here from below. The gripping region can comprise a translucent bottom for this purpose.

In the exemplary embodiment, by means of the optical sensor 10, the control unit 8 detects the position and/or alignment of the rivet elements 3 in the rivet delivery unit 4, in particular in the gripping region. For gripping the rivet elements 3, the control unit 8 actuates the robot to pick up, in particular to grip, a rivet element 3 on the basis of the position and/or alignment of the rivet elements 3. The alignment is to be understood here as the orientation of the longitudinal axis of the rivet element 3 and in particular of its head 3c.

Here, by means of the sensor arrangement 9, in particular the optical sensor 10, the control unit 8 detects the genus, such as the type, of a rivet element 3 which is delivered by the rivet delivery unit 4 and lies in particular in the gripping region 4c. The type of a rivet element 3 differs in this respect from the genus thereof in that the genus determines the manner of the rivet, rivet collar and/or spacer, but is not fixed with regard to the dimensions of its features, in particular with regard to its nominal dimensions. The type of a rivet element 3 specifies not only the genus, but also the nominal dimensions of the rivet element 3, that is to say in particular the nominal diameter and the nominal length.

The control unit 8 can control whether the type is a required type to be filled into a rivet cartridge 2. In this way, only such rivet elements 3 which correspond to the required type are able to be supplied to the rivet cartridge 2 or the rivet cartridges 2.

Predetermined characteristics of the rivet elements 3 that are relevant to the drilling process and/or the riveting process, in particular of the rivet elements 3 as such, can be detected prior to being supplied to the rivet cartridge 2. The predetermined characteristics of the rivet elements 3 that are relevant to the drilling process and/or the riveting process can be geometric characteristics of the rivet elements 3 and the control unit 8 measures said characteristics by means of a sensor arrangement 9, in particular by means of an optical sensor 10 which is assigned to the sensor arrangement 9 and/or a testing unit 11 which is assigned to the sensor arrangement 9. This enables, when the rivet joint is subsequently produced, matched drilling and/or riveting corresponding to the detected characteristics of the rivet element 3 and/or the selection of a rivet element 3 which is suitable for a performed drilling operation. In particular, head protrusions of a rivet element 3 beyond a predefined tolerance range can be effectively avoided in this way.

The characteristics of the rivet elements 3 that are relevant to the drilling process and/or the riveting process can be the characteristics on account of which the drilling process and/or the riveting process is adapted in a rivet element specific manner, in particular for rivet elements 3 of the same type, or the characteristics on account of which the rivet element 3 is selected for a performed bore as opposed to a rivet element 3 of the same type for the same.

Here, the characteristics that are relevant to the drilling process and/or the riveting process can be the rivet length and/or the shank diameter and/or the shank length. Said variables are detected here by the sensor arrangement 9, in particular the sensor 10 directed onto the gripping region. For detecting characteristics of the rivet elements 3 to be detected by means of the optical sensor 10, in particular the characteristics of rivet length and/or shank diameter and/or shank length, the control unit 8 carries out a transformation of the optical receiving means. This is necessary as, for example, the rivet heads of the rivet elements 3 bring about here a slight inclined position in the gripping region 4c. The measuring tolerance of said measurement can be within the range of at least 500 mµ, further of at least 200 mµ, further of at least 100 mµ.

Here, the control unit 8 tests the rivet elements 3 for damage by means of the sensor arrangement 9, in particular the optical sensor 10. It can be recognized here, for example, whether the head 3c of a rivet element 3 is missing. The detecting or testing of the rivet elements 3 by means of the sensor 10, which is directed onto the gripping region 4c, can be effected prior to the rivet elements 3 being gripped by the robot 6.

The rivet loading station 1 can comprise a testing unit 11 for detecting predetermined characteristics of the rivet elements 3 that are relevant to the drilling process and/or the riveting process. The testing unit 11 is also controlled here by the control unit 8.

Here, using the testing unit 11, a rivet head diameter $D_K$ and/or a rivet head length $L_K$ and/or an angle of a rivet countersunk head W and/or a transition radius R are measured and detected as predetermined characteristics that are relevant to the drilling process and/or the riveting process. A transition radius R is here a radius between two portions of a rivet element 3, in particular between head 3c and shank 3d of a rivet 3a. In addition, where applicable, the shank diameter $D_S$ can also be determined. Here, the measuring tolerance of the measurement with the testing unit 11 is clearly smaller, in particular smaller by at least the factor 10, than the measuring tolerance in the case of measurement with the optical sensor 10 that is directed onto the rivet delivery unit 4.

Furthermore, the measurements with the optical sensor 10 that is directed onto the rivet delivery unit 4 and with the testing unit 11 differ in that with the optical sensor 9 that is directed onto the rivet delivery unit 4, multiple rivet elements 3 are detected at the same time and, in particular fully, whilst with the testing unit 11 only a detail of one rivet element 3 is detected.

Here, the testing unit 11 comprises an optical sensor 11a. Pre-determined characteristics that are relevant to the drilling operation and/or the riveting operation are detected with the optical sensor 11a of the testing unit 11. The control unit 8 can detect said characteristics by means of the optical sensor 11a.

The visual axis A of the optical sensor 10 directed onto the rivet delivery unit 4 and the visual axis B of the optical sensor of the testing unit 11a do not extend here parallel to one another. Further, the visual axis A of the optical sensor 9 directed to the rivet delivery unit 4 and the visual axis B of the optical sensor 11a of the testing unit 11 are substantially orthogonal to one another. In this way, a test of the rivet element 3 can be effected from two different sides and faults of a rivet element 3 that are only marked on one side can be better recognized.

In addition to this or as an alternative to it, the testing unit 11 can comprise a lighting unit 11b for measuring the predetermined characteristics that are relevant to the drilling process and/or the riveting process which illuminates the rivet element 3 during the detecting operation. The lighting unit 11b is arranged here opposite the sensor 11a of the testing unit 11. The lighting axis and the visual axis B of the optical sensor 11a, in this case, can be arranged coaxially. The viewing direction of the sensor 11 and of the lighting unit 11b are aligned here on top of one another.

In the exemplary embodiment, the testing unit 11 is realized as a system that is telecentric on both sides. This enables precise measuring without positioning the rivet element 3 precisely between the lighting unit 11b and the optical sensor 11a.

Here, the measuring tolerance with the testing unit is less than +/−5 μm, such as less than +/−3 μm, further substantially at +/−2 μm.

In addition, a further test of the rivet elements 3 can be provided. This is carried out here by a further testing unit 12. The further testing unit 12 comprises an optical and/or mechanical sensor. Depending on the characteristic of the rivet elements 3 to be detected, the further testing unit 12 can be realized as the testing unit 11. However, it can also comprise a different design.

For example, the testing unit 12 can be provided for testing rivet elements 3, in particular rivet collars 3b and/or spacers. The rivet elements 3 can be pushed onto said testing unit for testing and/or the testing unit can be dipped in said rivet elements 3. Such a testing unit 12 has proved its worth in particular for testing screw collars and/or crimping collars. Using such a testing unit 12, closing grooves and/or closing threads can be detected and tested in particular by means of a pattern recognition.

Here, a testing unit 11, 12 carries out pattern recognition for recognizing and/or measuring features on the shank 3d of the rivet element 3. For example, the pattern recognition can detect and test closing grooves 3e and/or closing threads.

Here, the robot 6 transports the rivet elements 3, in particular individually, from the rivet delivery unit 4 to a testing unit 11, 12 or to the testing units 11, 12. The robot 6 can hold the rivet element 3 in a gripped manner during the test or the tests with the testing unit 11, 12 or the testing units 11, 12. The tests are carried out here sequentially. The rivet element 3 is also transported here between the testing units 11, 12 by the robot 6. Where applicable, it can be necessary for the robot 6 to deposit the rivet element 3 between two testing units 11, 12 and to re-grip it. This is sensible in particular when the gripper 7 of the robot 6, on account of the size of the rivet element 3, can only grip said rivet element such that variables to be measured are hidden when it is being gripped.

After testing in the testing unit 11, 12 or the testing units 11, 12, the rivet element 3 is supplied here to the rivet cartridge 2.

The method is realized in a manner in such a way that all rivet elements 3 supplied to a rivet cartridge 2 have been tested for the predetermined characteristics that are relevant to the drilling process and/or the riveting process. However, at least 50%, further such as at least 80%, at least 95% of all rivet elements 3 supplied to a rivet cartridge can be tested. In this respect, the method differs here from a batch-wise random test on rivet elements 3 at a rivet producer in that a significant number of rivet elements 3 are tested by the rivet loading station 1 for predetermined characteristics that are relevant to the drilling process and/or the riveting process prior to being supplied to the rivet cartridge 2. Faulty rivet elements 3 can be detected by the control unit 8 and the faults thereof reported. The faulty rivet elements 3 can be assigned to the secondary packaging from which they were removed. This enables comprehensive complaint management of rivet elements 3 with respect to the manufacturer of the rivet elements 3.

In addition to this or as an alternative to it, multiple rivet cartridge receiving means 5 with rivet cartridges 2 are provided, the detected or tested rivet elements 3 being supplied to a rivet cartridge 2 in dependence on the detected characteristics of a rivet element 3. Rivet elements 3 of the same type can be supplied to at least two of the multiple rivet cartridges 2. This is advantageous in particular for sorting the rivet elements 3 as described below.

Subcategories can be formed for sorting the rivet elements 3 of a type and a rivet cartridge 2 is assigned to said subcategories, in particular in each case. In addition to this or as an alternative to it, subcategories can be formed on the basis of the data regarding the rivet elements 3, in particular the specification of the rivet elements 3, and a rivet cartridge 2 can be assigned to said subcategories, in particular in each case. The rivet elements 3 can then be supplied to the rivet cartridge 2 assigned to said subcategory corresponding to their categorization into a subcategory in dependence on their test in the testing unit 11, 12.

The subcategories can be formed by tolerance ranges. In this way, batch sub-distribution of rivet elements 3 into the rivet cartridges 2 is possible. The rivet elements 3 can therefore be sorted in such a manner by the rivet loading station 1 that the rivet elements 3, in particular originating from secondary packaging, are sorted into various smaller tolerance ranges. Then only rivet elements 3 with a smaller tolerance range overall than the rivet elements 3 supplied to the rivet loading station 1 originally from secondary packaging are situated in the individual rivet cartridges 2 after sorting.

In this context, it has proved particularly worthwhile when data regarding the rivet elements 3 supplied to a rivet cartridge or rivet elements 3 to be supplied to a rivet cartridge 2 are linked. The data, in particular the specification and/or the subcategory can be linked to the rivet cartridge 2. In this case, this can be in particular a tolerance range. In addition to this or as an alternative to it, however, characteristics, in particular dimensions, of each individual rivet element and where applicable the sequence of the rivet elements 3 in the rivet cartridge 2 can also be linked with the rivet cartridge 2. The linking can occur, for example, as a result of said data being written on an RFID chip of the rivet cartridge 2. As a result, precise matching of the drilling and the riveting process to the rivet elements 3 provided for riveting is made possible.

On the basis of said data, one rivet element 3 from various rivet elements 3 of a type can be subsequently selected for placement into the bore after measuring a bore by a finishing facility 14 requesting a corresponding rivet element 3. In addition to this or as an alternative to it, the bore to be generated with the finishing facility 14 can be determined or adapted on the basis of a rivet element 3 to be placed—in particular on account of its categorization into a subcategory, for example the countersinking depth to be drilled can be determined or adapted in dependence on the dimensions of the rivet head. The linked data can be interrogated for this reason by the finishing facility 14.

The rivet cartridge receiving means 5 and/or the rivet cartridge 2 comprise here a pocket 5a into which the rivet elements 2 are deposited by the robot 6. Where applicable, the rivet cartridge 2 can also take over the rivet elements 2 directly from the robot 6.

The rivet elements 3 are conveyed into the rivet cartridge 2 here by means a pressure difference, that is to say in particular by means of negative pressure and/or by means of compressed air into the rivet cartridge 2. In this case, the rivet elements 3 can be conveyed with the shank 3d or the head first into the rivet cartridge 2.

The rivet elements 3 are received by the rivet cartridge 2 here in an aligned manner, in particular in a positionally defined manner. This can be effected for example in the rivet cartridge 2 by an, in particular, wound hose in which the rivet elements 3 are received and by which the rivet elements 3 are guided. It has proved to be particularly worthwhile when the supply or removal of the rivet elements 3 into the rivet cartridge 2 or out of the rivet cartridge 2 is effected according to the first in-first out principle and/or according to the first in-last out principle. The sequence of the rivet elements 3 in the rivet cartridge 2 can not be modified within the rivet cartridge.

As proceeds from the above description and FIG. 1, the rivet delivery unit 4, where applicable the testing units 11, 12 and the rivet cartridge receiving means 5 with a rivet cartridge 2, where applicable received therein, are chained together, that is to say are arranged in particular spatially together. The rivet elements 3 can be supplied to the rivet cartridge 2 by an, in particular immovably mounted, robot 6 from the rivet delivery unit 4 where applicable above the testing units 11, 12. However, multiple robots 6 can also be provided, where applicable, for the transport.

Faulty rivet elements 3 can be supplied to a reject container 13a. This can be effected, for example, in a robot-based manner, in particular by means of the robot 6, or, however, should the faulty rivet elements 3 be effected in the gripping region 4c, good rivet elements 3 can be supplied by the robot 6 to the rivet cartridges 2 and, in particular when only faulty rivet elements 3 still remain in the gripping region, the rivet elements 3 remaining in the gripping region 4c are supplied from the rivet delivery unit 4, for example by means of wobbling movements, to a reject container 13b.

Figure 2:
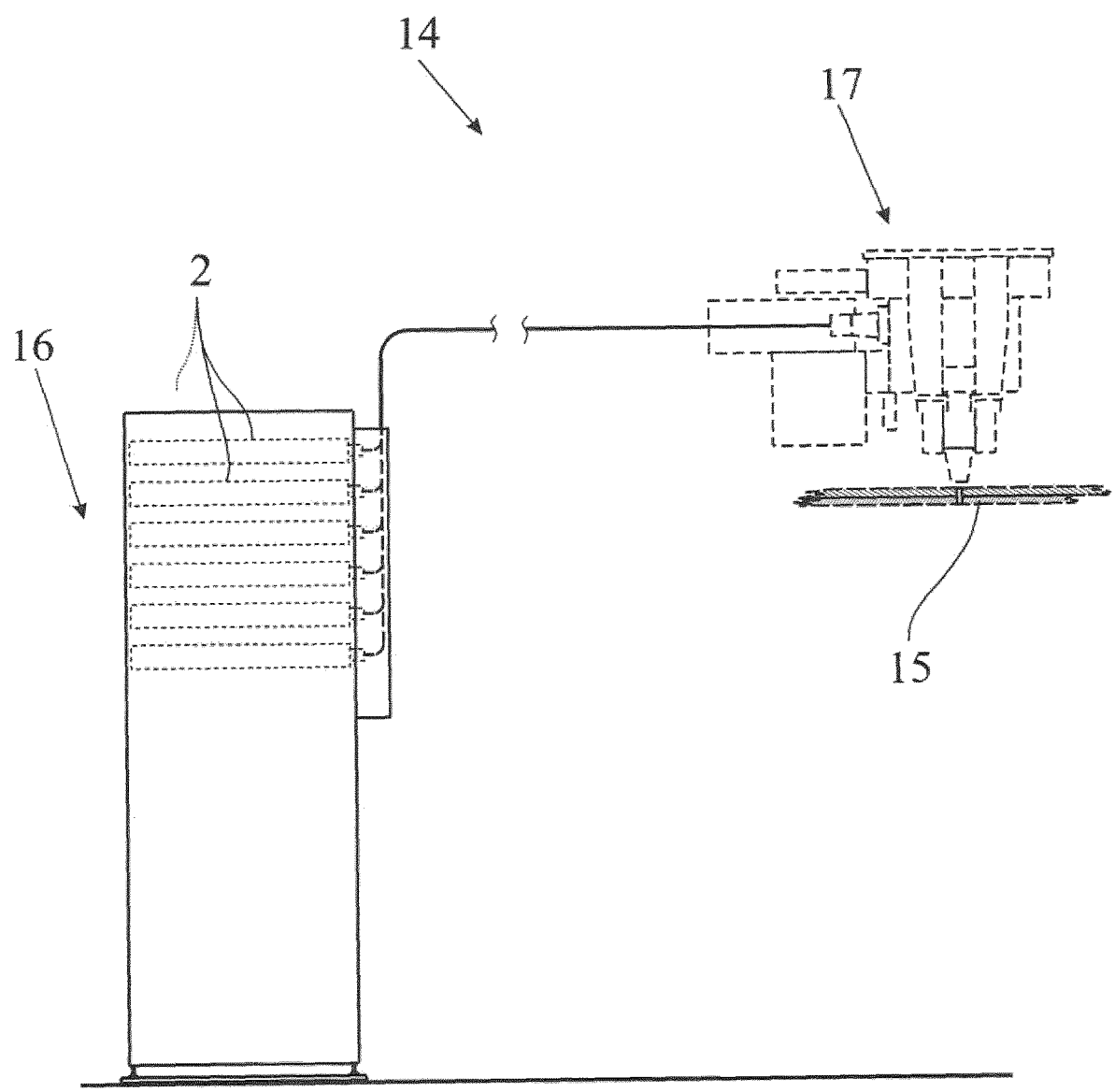
FIG. 2 shows a schematic representation of a production facility with a rivet storage unit and a drill/rivet tool and FIG. 3 shows rivet elements gripped by a gripper as an example.

FIG. 2 shows a schematic representation of the finishing facility 14 as proposed for producing a structural component 15. Once a rivet cartridge 2 has been filled using the previously described method, said rivet cartridge 2 can be inserted into a rivet storage unit 16. The finishing facility 14 comprises a drill-rivet tool 17 for drilling and riveting.

On the basis of the data linked to the rivet cartridge 2, the finishing facility 14 can adapt the drilling process and/or the riveting process to the rivet element 3 to be affixed. In addition to this or as an alternative to it, a suitable rivet element 3 can be requested from the rivet storage unit 16 for an already drilled and where applicable measured hole.

In some embodiments, the drilling and/or the riveting is consequently performed on the basis of the predetermined characteristics of the rivet elements 3 that are relevant to the drilling operation and/or the riveting operation, detected prior to supplying the rivet elements 3 to the rivet cartridge 2, and/or, a suitable rivet element 3 for a bore 15a is requested from the rivet storage unit 16 and a rivet joint is produced on the basis of the predetermined characteristics of the rivet elements 3 that are relevant to the drilling operation and/or the riveting operation, detected prior to supplying the rivet elements 3 to the rivet cartridge 2.

Of particular importance, in this case, is in particular the measuring of the heads 3c of the rivet elements 3 and the adaptation of the bore 15a, in particular of the countersinking 15b on the head 3c of the rivet element 3 or the selection of a rivet element 3 with a suitable head 3c for a bore 15a, in particular the countersinking 15b of a bore 15a. According to some embodiments of the method, the rivet loading station 1 detects, for example, the rivet head diameter and/or the rivet head length prior to supplying the rivet element to the rivet cartridge as predetermined characteristics of the rivet elements 3 that are relevant to the drilling process and/or the riveting process and that the finishing facility determines and performs the bore on the basis of the rivet head diameter and/or the rivet head length, in particular determines and performs the countersinking depth for the bore.

Figure 3:
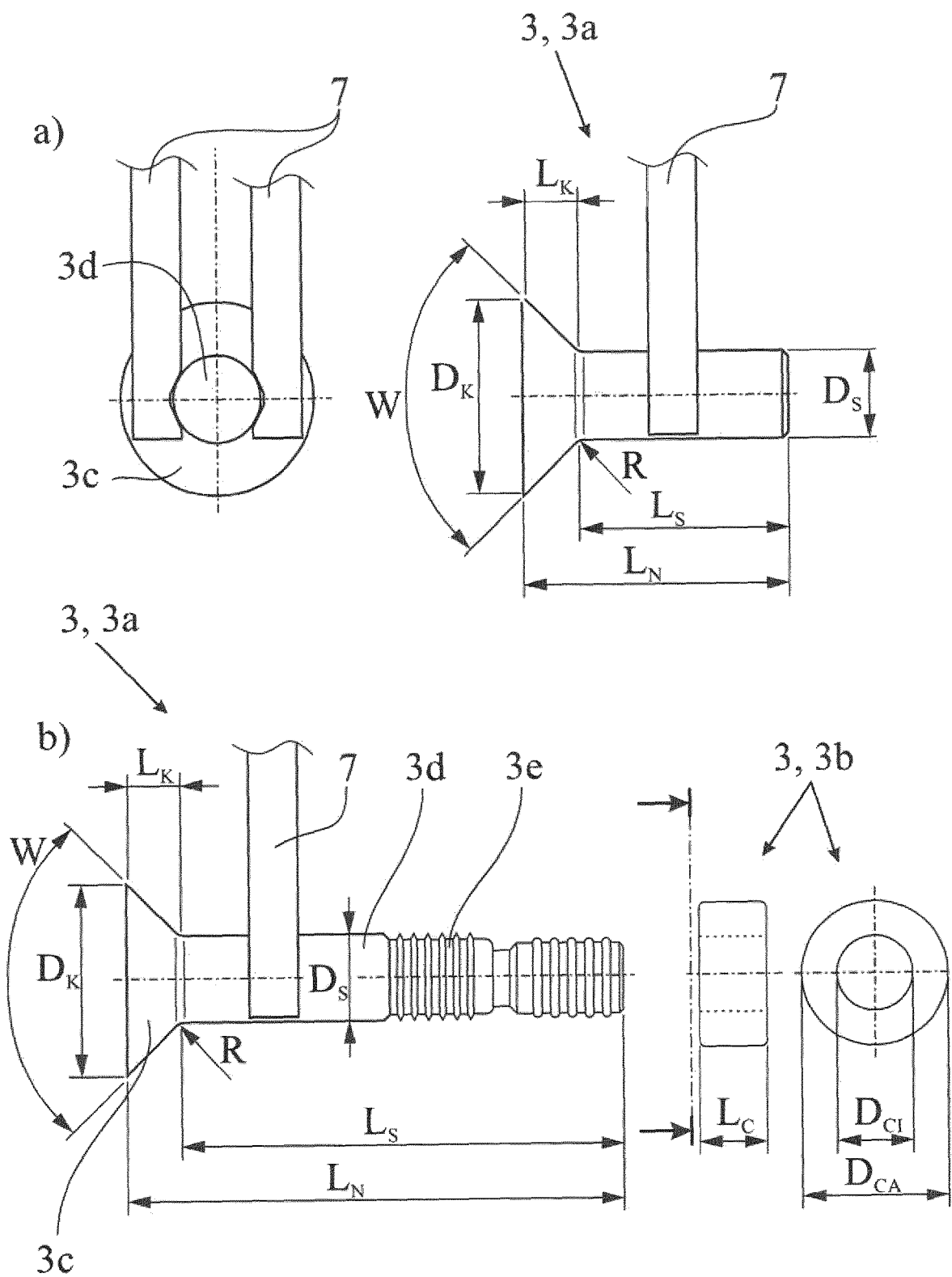

FIG. 3 shows finally as an example of the rivet elements 3 in a) a full rivet with a countersunk head, in b) a fitted rivet with a countersunk head and a rivet collar 3b which corresponds to the fitted rivet. Furthermore, many further rivet elements can also be supplied in the same way to rivet cartridges by way of the rivet loading station. These can also be, in particular, screw rivets and/or blind rivets.

For the rivet elements 3 shown in FIG. 3, possible relevant characteristics for the drilling process and/or the riveting process are shown as an example, a selection from said characteristics being able to depend in each case on the demands of the rivet joint to be generated. The relevant characteristics measured here are the rivet length $L_N$ and/or the shank length $L_S$ and/or the head length $L_K$ and/or the head diameter $D_K$ and/or the shank diameter $D_S$. In addition, the countersunk head angle W and the transition radius R are marked as possible characteristics that are relevant to the drilling process and/or the riveting process. Furthermore, a rivet structure, namely the closing grooves 3e of the fitting rivet in FIG. 3b), is shown.

For the rivet collar 3b, the rivet collar length $L_C$ and the rivet collar inside diameter $D_{CI}$ and the rivet collar outside diameter $D_{CA}$ are shown here as characteristics that are relevant to the riveting process.

The invention claimed is:

1. A method for filling a rivet cartridge with rivet elements using a rivet loading station having a rivet delivery unit for delivering the rivet elements and having a rivet cartridge receiving element for receiving a rivet cartridge,
   wherein the rivet elements are supplied from the rivet delivery unit to a rivet cartridge which is received in the rivet cartridge receiving element and are received therein in an aligned manner,
   wherein at least part of the transport from the rivet delivery unit to the rivet cartridge is effected in a robot-based manner,
   wherein the rivet loading station comprises a control unit for controlling the rivet loading station, wherein the control unit detects a type of rivet element which is delivered by the rivet delivery unit, wherein the control unit controls whether the detected type of rivet element is a required type of rivet element to be filled into the rivet cartridge,
   wherein rivet elements of the same type can be supplied to at least two of multiple rivet cartridges, and
   wherein the rivet elements are supplied in dependence on a test from a testing unit to the rivet cartridge assigned to a subcategory corresponding to the rivets' categorization into a subcategory.

2. The method as claimed in claim 1, wherein rivets of a different genus comprising at least one of a different type, a different nominal length and a different nominal diameter, can be supplied to a rivet cartridge or to different rivet cartridges by the rivet loading station without modifying the mechanical configuration of the rivet loading station; and wherein the rivet elements are separated into singles in the rivet delivery unit and supplied to a gripping region.

3. The method as claimed in claim 1, wherein rivet collars of a different genus comprising at least one of a different type, a different nominal length and a different nominal diameter, can be supplied to a rivet cartridge or to different rivet cartridges by the rivet loading station without modifying the mechanical configuration of the rivet loading station.

4. The method as claimed in claim 1, wherein rivets and rivet collars can be supplied to a rivet cartridge or to different rivet cartridges by the rivet loading station without modifying the mechanical configuration of the rivet loading station.

5. The method as claimed in claim 1, wherein the rivet elements are separated into singles in the rivet delivery unit and supplied to a gripping region.

6. The method as claimed in claim 1, wherein characteristics of the rivet elements that are relevant to a drilling process and/or a riveting process are detected prior to supplying them to the rivet cartridge.

7. The method as claimed in claim 1, wherein the control unit tests the rivet elements for damage using the optical sensor of the sensor arrangement.

8. The method as claimed in claim 6, wherein a characteristic that is relevant to the drilling process and/or the riveting process is a rivet length and/or a shank diameter and/or a shank length.

9. The method as claimed in claim 6, wherein the characteristics of the rivet elements are detected with a testing unit comprising an optical sensor, and wherein a visual axis of the optical sensor directed to the rivet delivery unit and a visual axis of the optical sensor of the testing unit do not extend parallel to one another.

10. The method as claimed in claim 1, wherein the rivet cartridge receiving element and/or rivet cartridge comprise a pocket into which the rivet elements are deposited.

11. The method as claimed in claim 1, wherein the rivet elements are conveyed into the rivet cartridge by a pressure difference.

12. A method to produce a structural component,
   wherein a rivet cartridge is filled as claimed in claim 1 and wherein the rivet cartridge is then inserted into a rivet storage unit of a production facility for producing a structural component and the production facility drills a hole in a structural component for generating a rivet joint and inserts a rivet element from the rivet cartridge into the hole and rivets.

13. A rivet loading station for carrying out a method as claimed in claim 1.

14. The method as claimed in claim 5, wherein the rivet elements are gripped in the gripping region in a robot-based manner.

15. The method as claimed in claim 1, wherein the control unit detects the position and/or alignment of the rivet elements in the rivet delivery unit using the optical sensor of the sensor arrangement.

16. The method as claimed in claim 15, wherein the control unit actuates a robot to pick up a rivet element on the basis of the position and/or alignment of the rivet elements.

17. The method as claimed in claim 9, wherein the visual axis of the optical sensor directed to the rivet delivery unit and the visual axis of the optical sensor of the testing unit extend substantially perpendicularly to one another.

* * * * *